US012287296B2

(12) United States Patent
Pruimboom

(10) Patent No.: US 12,287,296 B2
(45) Date of Patent: Apr. 29, 2025

(54) LAMP WITH DOUBLE-WALLED HOUSING, FOR HYPERSPECTRAL IMAGING

(71) Applicant: PARATA SYSTEMS, LLC, Durham, NC (US)

(72) Inventor: Dries Johannes Pruimboom, Gorredijk (NL)

(73) Assignee: PARATA SYSTEMS, LLC, Durham, NC (US)

( * ) Notice: Subject to any disclaimer, the term of this patent is extended or adjusted under 35 U.S.C. 154(b) by 0 days.

(21) Appl. No.: 18/255,295

(22) PCT Filed: Dec. 3, 2021

(86) PCT No.: PCT/EP2021/084267
§ 371 (c)(1),
(2) Date: May 31, 2023

(87) PCT Pub. No.: WO2022/117871
PCT Pub. Date: Jun. 9, 2022

(65) Prior Publication Data
US 2024/0094136 A1 Mar. 21, 2024

(30) Foreign Application Priority Data

Dec. 3, 2020 (NL) .................................... 2027037

(51) Int. Cl.
*G01N 21/88* (2006.01)
*F21V 15/01* (2006.01)
(Continued)

(52) U.S. Cl.
CPC ......... *G01N 21/8806* (2013.01); *F21V 15/01* (2013.01); *F21V 29/60* (2015.01); *G01N 21/9508* (2013.01)

(58) Field of Classification Search
CPC ...... F21V 29/503; F21V 29/505; F21V 29/60; F21V 29/15; F21V 29/83; F21V 15/01; H01J 7/24
(Continued)

(56) References Cited

U.S. PATENT DOCUMENTS

| 1,402,374 | A | * | 1/1922 | Papini ................. A61B 3/0008 313/344 |
| 1,500,639 | A | * | 7/1924 | Rekar ..................... F21S 6/006 362/297 |
| 1,637,786 | A | * | 8/1927 | Rekar ..................... F21V 29/83 362/294 |

(Continued)

FOREIGN PATENT DOCUMENTS

| JP | S6161669 A | 3/1986 |
| JP | 2007109506 A | 4/2007 |
| WO | 2014119994 A1 | 8/2014 |

OTHER PUBLICATIONS

International Search Report and Written Opinion in corresponding International application No. PCT/EP2021/084267 dated Mar. 11, 2022.

*Primary Examiner* — Ismael Negron
(74) *Attorney, Agent, or Firm* — Steven M. Koehler; Westman, Champlin & Kochler, P.A.

(57) ABSTRACT

The lamp includes an illumination source; and a housing structure having an inner wall forming an inner housing with an inner aperture, and outer wall forming an outer housing with an outer aperture. The inner housing encloses the illumination source, and the outer housing encloses the inner housing with the outer aperture arranged around the inner aperture so that light produced by the illumination source can exist the inner housing. A space between the inner and outer wall forms a thermal barrier between the illumination source and the exterior of the lamp. A first outlet is connected to the inner housing for air to flow from the inner aperture towards the first outlet. The lamp is used in a (Continued)

hyperspectral imaging system of a medicine inspection system.

17 Claims, 6 Drawing Sheets

(51) Int. Cl.
*F21V 29/60* (2015.01)
*G01N 21/95* (2006.01)
(58) Field of Classification Search
USPC .................................................. 362/373
See application file for complete search history.

(56) References Cited

U.S. PATENT DOCUMENTS

| | | | | |
|---|---|---|---|---|
| 2,016,474 A * | 10/1935 | Wood | ............... | A61N 5/06 |
| | | | | 607/90 |
| 2,799,773 A * | 7/1957 | Schwartz | ............... | F21V 7/10 |
| | | | | 362/345 |
| 3,119,567 A * | 1/1964 | Schwartz | ............... | F21V 21/30 |
| | | | | D26/65 |
| 4,302,801 A * | 11/1981 | Duddy | ............... | F21V 25/00 |
| | | | | 362/345 |
| 4,630,182 A * | 12/1986 | Moroi | ............... | F21V 29/83 |
| | | | | 362/345 |
| 4,658,338 A * | 4/1987 | Bertozzi | ............... | F21V 29/83 |
| | | | | 362/640 |
| 5,134,554 A * | 7/1992 | Donato | ............... | F21V 29/83 |
| | | | | 362/651 |
| 5,626,416 A * | 5/1997 | Romano | ............... | F21S 10/02 |
| | | | | 362/264 |
| 6,224,248 B1 | 5/2001 | Chiba | | |
| 7,901,110 B2 * | 3/2011 | Mulay | ............... | H01J 7/26 |
| | | | | 362/264 |
| 8,858,040 B2 * | 10/2014 | Rodriguez | ............... | H05B 45/375 |
| | | | | 362/373 |
| 2014/0319351 A1 | 10/2014 | Yamada et al. | | |

\* cited by examiner

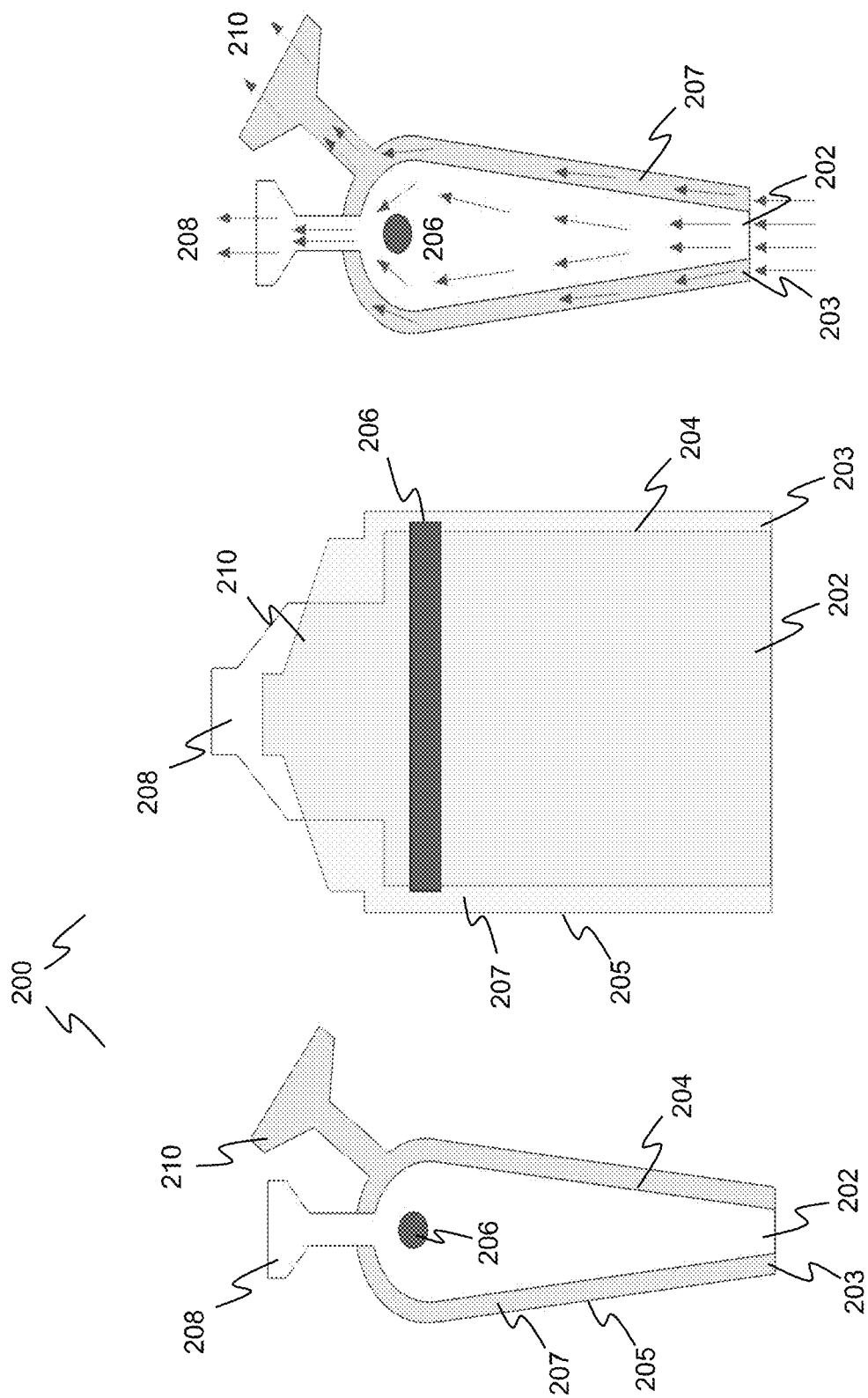

LAMP WITH DOUBLE-WALLED HOUSING, FOR HYPERSPECTRAL IMAGING

CROSS-REFERENCE TO RELATED APPLICATION(S)

The present application is a § 371 national phase entry of International patent application Serial No. PCT/EP2021/084267, filed Dec. 3, 2021, and published in English, and claims priority from Netherlands application no. 2027037 filed on Dec. 3, 2020.

FIELD OF THE INVENTION

The invention relates to a lamp for hyperspectral imaging, and, in particular, though not exclusively, a near infrared lamp and lamp system for hyperspectral imaging, a hyperspectral imaging system comprising such lamp and a medicine inspection system comprising such hyperspectral imaging system.

BACKGROUND OF THE INVENTION

Medicament inspection systems are systems that allow inspection of medicaments, for example packaged medicaments, e.g. a blister package or pouch comprising different medicaments, pills, tablets, capsules and/or ampules, according to a prescription.

For example, US2014/0319351 describes an example of an inline inspection system for inspecting drugs, pills or tablets in a blister package, based on hyperspectral imaging in the near infrared (NIR) part of the electromagnetic spectrum. The inspection system is configured to illuminate pills in a blister package with light from a halogen lamp. A hyperspectral pixelated image sensor then detects fifteen response values for fifteen bands in the NIR spectrum. This way, for each pixel of the hyperspectral image sensor, multiple spectral response values are detected which collectively define the spectral response of the object at that pixel location. This spectral response may then be compared to a reference in order to determine if the pills have the correct composition and/or contain certain active ingredients.

Building an accurate high-throughput medication inspection system that includes a hyperspectral imaging system as described above however is problematic for several reasons. Firstly, NIR responses of pharmaceutically active compounds are relatively weak signals spread over different parts of the NIR spectrum. Moreover, these signals often need to be detected through the packaging material. To that end, a large number, e.g. a few hundred or more, spectral response values per pixel needs to be determined in order to allow sufficiently accurate analysis of the NIR responses. The packages need to be illuminated by a diffuse homogeneous NIR illumination source, having an irradiance that is sufficiently high so that it penetrates the package material and illuminates the medication so that a sufficiently large response signal can be detected without damaging the packaging material and the medication.

Typical NIR illumination sources include solid-state illumination sources, such as light emitting diode (LED) type sources, and incandescent light sources, such as halogen lamps, that are based on a high-temperature heated filament. A problem of incandescent light sources however is that they produce a large amount of heat. Integration of such illumination sources in an inspection system may cause the illumination source to heat up parts of the system thereby affecting the performance of the system.

Hence, there is need in the art for lamps for hyperspectral imaging, in particular there is a need in the art for reliable cheap lamp for a hyperspectral imaging system which can be integrated in an apparatus, such as high-throughput medicine inspection system, without affecting its performance.

SUMMARY OF THE INVENTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

The methods, systems, modules, functions and/or algorithms described with reference to the embodiments in this application may be realized in hardware, software, or a combination of hardware and software. The methods, systems, modules, functions and/or algorithms may be realized in a centralized fashion in at least one computing system, or in a distributed fashion where different elements are spread across several interconnected computing systems. Any kind of computing system or other apparatus adapted for carrying out the embodiments (or parts thereof) described in this application is suited. A typical implementation may comprise one or more digital circuits such as application specific integrated circuits (ASICs), one or more field programmable gate arrays (FPGAs), and/or one or more processors (e.g., x86, x64, ARM, PIC, and/or any other suitable processor architecture) and associated supporting circuitry (e.g., storage, DRAM, FLASH, bus interface circuits, etc.). Each discrete ASIC, FPGA, processor, or other circuit may be referred to as "chip," and multiple such circuits may be referred to as a "chipset." In an implementation, the programmable logic devices may be provided with fast RAM, in particular block RAM (BRAM). Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure.

The flowcharts and block diagrams in the figures may represent architecture, functionality, and operation of possible implementations of the methods, systems and/or modules to various embodiments of the present invention. In this regard, each block in a flowchart or a block diagram may represent a module, segment, or portion of code, which may be implemented as software, hardware or a combination of software and hardware.

It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Near infrared (NIR) illumination sources based on arrays of light emitting diodes (LEDs) have the disadvantage that typically the NIR spectrum of these light sources exhibits large minima and maxima. In contrast, incandescent illumination sources exhibit a relatively smooth continuous NIR spectrum that is suitable as an illumination source for hyperspectral imaging. Moreover, incandescent lamps are cheap when compared to the LED arrays. A disadvantage however is that such light sources produce a large amount of heat, which hinders such lights sources to be integrated in an apparatus.

It is an aim of the embodiments in this application to provide a lamp that is suitable for use in a hyperspectral imaging system that does not exhibit the disadvantages of lamps known from the prior art. Further, it is an aim of the embodiments to provide a lamp for a hyperspectral imaging system that can be integrated in an apparatus, such as a medicine inspection apparatus for inspecting medicine objects, e.g. pills, tablets, capsules, ampules and/or packages or pouches comprising such medicine objects.

In a first aspect, the invention may relate to a lamp comprising an illumination source; and, a housing structure including an inner wall and an outer wall, wherein the inner wall forms an inner housing for the illumination source, the inner housing including an inner aperture part. The outer wall of the lamp may be configured as an outer housing for the inner housing, wherein the outer housing may include an outer aperture part formed around the inner aperture part so that light produced by the illumination source can exit the inner housing and form an illumination beam. The space between the inner and outer wall may form a thermal barrier between the illumination source and the exterior of the lamp. Further, a first outlet formed in the wall of the inner housing may connect the inside of the inner housing to the outside of the lamp, so that, when the lamp is used, a first flow, for example an air flow, may be generated in the first housing towards the first outlet.

In an embodiment, the housing structure may be double wall housing structure. In a further embodiment, a second outlet formed in the wall of the outer housing may connect the spacing between the inner wall of the inner housing and the outer wall of the outer housing to the outside of the lamp, so that when in use, a second flow, preferably an air flow, can be generated in the space between the inner and outer wall towards the second outlet.

Thus, the invention may relate to a lamp comprising an illumination source that is located in a housing wherein the housing both provides a thermal barrier between the illumination source inside the inner housing and the outside of the housing as well as means to transport heat produced by the illumination source away from the aperture of the housing which serves as the exit of the light produced by the illumination source. To that end, the lamp includes a double wall housing structures including an inner housing in which the illumination source is mounted and an outer housing that serves as a housing for the inner housing. Further, the inner housing includes a first outlet, i.e. an opening or channel in the wall of the inner housing connecting the inside of the inner housing to the outside. This way, a connection between the spacing of the inner housing and the outside of the lamp is achieved. This way a flow, e.g. an air flow, can be produced in the inner housing to transport the heat out of the inner housing away from the aperture so that the temperature at the aperture is kept relatively low, e.g. between 40 and 20 degrees Celsius.

The invention allows full control of the heat produced by the lamp so that lamp can be easily integrated in complex apparatuses comprising electrical and/or mechanical elements or devices, e.g. a hyperspectral camera which are sensitive to heat. Additionally, it allows to illuminate objects, e.g. medicine objects, during hyperspectral imaging with light of a continuous spectrum, in particular in the NIR part of the spectrum, without damaging the objects.

In an embodiment, the lamp may be configured for hyperspectral imaging and the illumination source is configured to produce light having a continuous spectrum, preferably a continuous spectrum in the near infrared part of the spectrum.

In an embodiment, the inner housing may comprise a curved part, wherein the curved part is configured to reflect near infrared radiation from the radiation source towards the inner aperture part, preferably a curved part including a reflective layer, preferably a metal reflective layer.

In an embodiment, the inner aperture may be shaped to form a line-shaped illumination area.

In an embodiment, the illumination source may be an incandescent light source, preferably a halogen light source. These illumination sources may produce light of a continuous spectrum in the visible and/or NIR spectral range. In another embodiment, a high-intensity discharge (HID) light source may be used. Such illumination sources may produce light of a continuous spectrum in the UV and/or visible range.

In an embodiment, the illumination source may be a tube-shaped incandescent light source. The tube-shaped incandescent light source may have a longitudinal axis and a radial axis, the aperture being a line-shaped aperture, preferably a rectangular shaped aperture, the longitudinal axis of the line-shaped aperture being oriented substantially parallel to the longitudinal axis of the tube-shaped incandescent light source.

In an embodiment, the illumination source may be positioned in the inner housing between the inner aperture part and the first air outlet.

In an embodiment, the inner housing may be thermally isolated from the outer housing.

In an embodiment, the outer housing is a metallic or a plastic housing.

In an embodiment, the first flow may be formed by air entering the inner aperture part and leaving the first outlet and/or the second flow is formed by air entering the outer aperture part and leaving the second outlet.

In a further embodiment, a flow may be generated by locally increasing the pressure at the aperture part of the lamp. In an embodiment, this may be achieved by enclosing the imaging system in a camera housing wherein the pressure inside camera housing can be controlled by a pressure controller.

In a further aspect, the invention relates to a lamp system, preferably a lamp system for hyperspectral imaging, comprising: an illumination source; and, a housing structure, preferably a double wall housing structure, including an inner wall and an outer wall, the inner wall forming an inner housing for the illumination source, the inner housing including an inner aperture part; wherein the outer wall is configured as an outer housing for the inner housing, the outer housing including an outer aperture part formed around the inner aperture part so that light produced by the illumination source can exit the inner housing, the space between the inner and outer wall forming a thermal barrier between the illumination source and the exterior of the lamp; and, wherein a first outlet is formed in the wall of the inner housing; and, a cooling system connected to the first outlet, so that when in use, a first flow is generated in the first housing towards the first outlet.

In an embodiment, the cooling system may be connected to a second outlet formed in the wall of the outer housing, so that a second flow can be generated in the space between the inner and outer wall towards the second outlet In an embodiment, the first flow may be a flow, e.g. air flow, formed by a gas entering the inner aperture part and leaving the first outlet.

In an embodiment, the second flow may be a flow, e.g. air or liquid flow, formed by a gas or fluid entering the spacing between the outer aperture part and the inner aperture part and leaving the second outlet.

In an aspect, the invention may be related to an imaging system comprising: a hyperspectral imaging camera having a field of view; and a lamp or a lamp system as described in the embodiments above, for illuminating an object in the field of view of the hyperspectral imaging camera.

In yet another aspect, the invention may relate to a medicine inspection system comprising a hyperspectral imaging system to any of the embodiments above, the hyperspectral imaging system being configured to image one or more medicine objects located in the field of view of the hyperspectral imaging camera, wherein the lamp or lamp system is configured to illuminate at least part of the one or more medicine objects with light of a continuous spectrum.

In an embodiment, the distance between the one or more medicine objects and the inner and/or outer aperture part, could be less than 50 mm, preferably less than 40 mm, more preferably less than 30 mm. The temperature at the aperture side of the lamp can be held relatively low, e.g. hand warm, so that the aperture side of the lamp can be positioned relatively close to the object. This way, a sufficient illumination intensity can be achieved without substantially heating the object. Furthermore, the airflow entering the light source also helps cooling the radiated area. In particular, in an embodiment, the distance between the one or more medicine objects and the inner and/or outer aperture part may be selected such that the gas entering the inner aperture provides a cooling airflow around the illuminated object.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 2A-2C depict different cross-sections of a lamp according to an embodiment of the invention;

DETAILED DESCRIPTION

Figure 1:
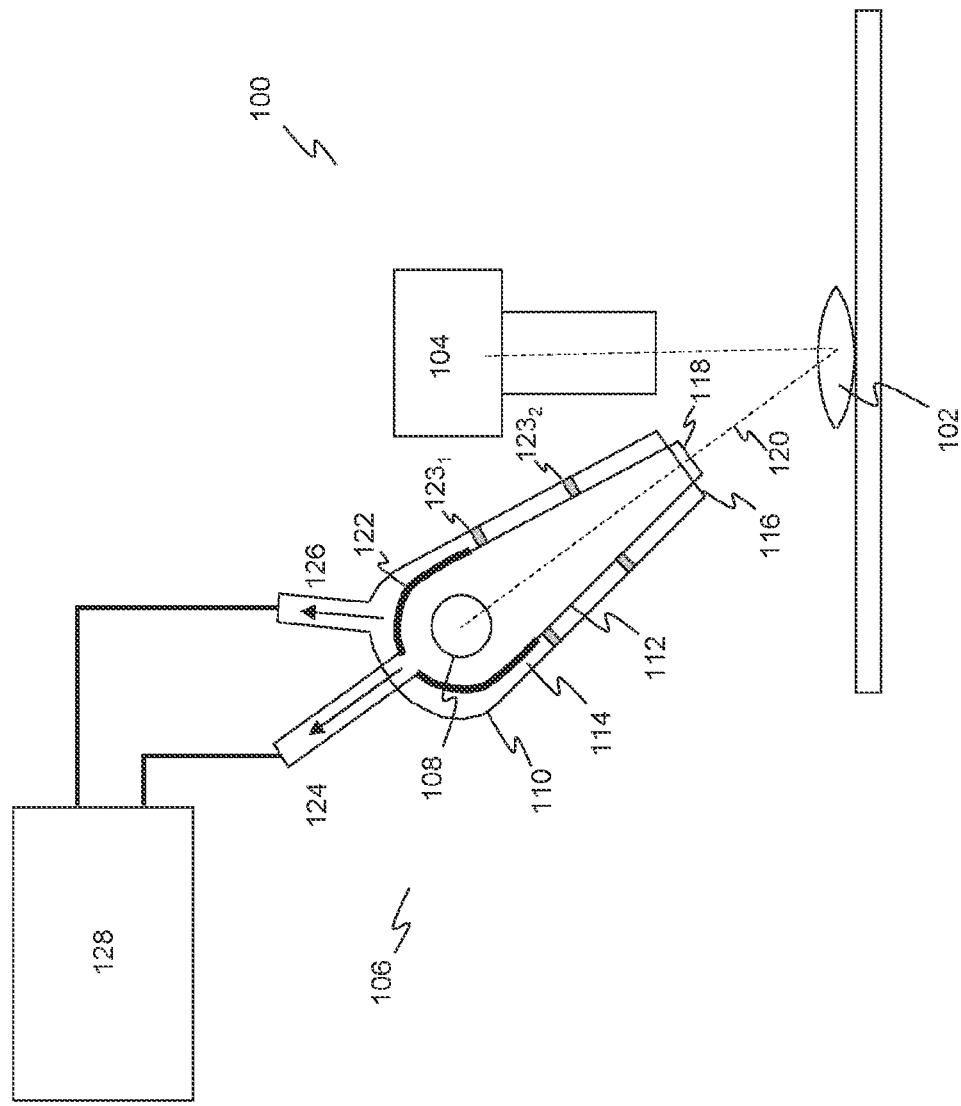
FIG. 1 depicts a hyperspectral imaging system comprising a lamp according to an embodiment of the invention.

FIG. 1 depicts a cross-sectional view of hyperspectral imaging system comprising a lamp according to an embodiment of the invention. In particular, the hyperspectral imaging system 100 may comprise a hyperspectral camera 104 and a lamp 106, for illuminating an object 102 during imaging. As will be described hereunder in more detail, the illumination source 108 of the lamp may be configured to generate light of a continuous spectrum, i.e. light with no substantial gaps or peaks in the electromagnetic spectrum, and continuous spectral intensity, i.e. without large minima and maxima minima.

In an embodiment, the hyperspectral imaging system may be configured to perform hyperspectral imaging on medicine objects, e.g. pills and/or tablets, capsules, ampules or packages or pouches comprising medicine objects. Pharmaceutically active compounds in the medicine object are responsive to near infrared radiation, i.e. radiation in the range between 900 and 1700 nm. This way, hyperspectral imaging may be a valuable tool for inspecting medicine objects, such as inspecting pharmaceutically active compounds in a medicine object.

For hyperspectral applications the illumination source may be selected to have at least a continuous spectrum, for example a continuous spectrum in the UV, visible and/or near infrared (NIR) range. Illumination sources that are suitable for that purpose include incandescent light sources, such as halogen lamps, that are based on a high-temperature heated filament. Incandescent light sources however produce large amounts of heat so that integration of the illumination source in a system, such as a medicament inspection system, may cause parts of the system to heat up hereby negatively affecting the performance of the system.

To address this problem, the illumination source 108 is mounted in a housing structure, a double wall housing structure, that includes at least an inner wall and an outer wall, wherein the inner wall may be shaped to form an inner housing 112 for the illumination source. The illumination source may be mounted in a curved part 122 of the inner housing. The inner housing may further comprise an aperture part, which may be referred to as an inner aperture part 118. The wall of the curved part of the inner housing may comprise a reflective surface. For example, in an embodiment, the curved part may be implemented as a metallic reflective layer 122 which is configured to reflect the light of the illumination source towards the inner aperture. This way, the light may be directed along a radial axis 120 towards the inner aperture and exit the inner housing as an illumination beam of a particular shape that is directed to the object that is imaged by the hyperspectral imaging camera.

As shown in the figure, the outer wall may be shaped to form a further housing, i.e. an outer housing 110, for the inner housing, wherein the outer housing may include an outer aperture part 116 which is located at the same side of the inner aperture 118 of the inner housing. The dimensions of the outer aperture may be larger than the dimensions of the inner aperture so that the outer aperture is formed around the inner aperture.

Further, a spacing 114 may be formed between the inner wall of the inner housing and the outer wall of the outer housing. In an embodiment, the inner housing and the outer housing may be shaped so that thermal contact between the inner and outer housing is minimized. For example, the inner and outer housing may be configured so that the inner and outer wall do not touch each other or only touch each other at specific points using e.g. a number of spacers $123_{1,2}$ of a low thermal conductive material. This way, the spacing 114 between the inner and outer wall may form a thermal barrier between the illumination source and the exterior of the lamp.

As shown in the figure, to illuminate the object with light, in particular near infrared light, the aperture part of the lamp will be positioned (along its radial axis) towards an object. In order to illuminate the object with light of sufficient intensity, the aperture part needs to be relatively close to the object. For example, the distance between the aperture part and the object may be 50 mm or less or even 30 mm or less. To prevent the heat of the illumination source from affecting the object or its surroundings, the housing may include one or more outlets 124,126 to transport heat originating from the illumination source to the outside of the lamp. The outlets allow the generation of a flow, e.g. an air or gas flow, inside the housing which is used to transport heat outside the housing and to keep the aperture side of the lamp relatively cool. The intake of cool air at the radiation aperture also causes an airflow over the illuminated object minimizing the temperature rise of these objects caused by the illumination.

A first outlet 124 may be formed in the wall of the inner housing wherein the first outlet may be used as an outlet, e.g. an air outlet, for the inner housing. For example, in an embodiment, the first outlet may be connected to a cooling system 128, such as an air cooling system, so that a first air flow can be generated within the inner housing wherein relatively cool air enters the inner aperture, flows through the inner housing, passes the illumination source and exits the inner housing via the first air outlet. Hence, the direction of the first air flow in the inner housing may be opposite to the direction of the radiation that exits the aperture to form an illumination beam for illuminating an object during imaging. This way, the temperature at the aperture of the lamp can be held relatively low, e.g. hand warm, and the aperture side of the lamp can be positioned relatively close to the object so that a sufficient illumination intensity can be achieved without substantially heating the object. Being close to the illuminated object also creates a cooling airflow around the object.

In a further embodiment, a second outlet 126 may be formed in the wall of the outer housing to form an outlet, e.g. an air outlet, for the spacing between the inner wall of the inner housing and the outer wall of the outer housing. This second outlet may also be connected to the cooling system (or another separate cooling system). This way, a second flow can be generated within the spacing, wherein a relatively cool gas, e.g. air, may enter the spacing via the opening 116 between the inner and outer aperture and flow along the walls of the inner and outer housing towards the second outlet 126 where the heated gas can exit the lamp. Hence, beside the formation of a thermal barrier, the double wall spacing also effectively serves as a cooling channel that allows for the transport of heat away from the lamp and its surroundings and keeping the temperature at the aperture side relatively cool.

In a further embodiment, the cooling system connected to the second outlet may be a liquid-based cooling system (not shown). In that case, the second outlet may be configured as an output allowing heated cooling liquid, e.g. water or the like, to exit the spacing. Similarly, the opening formed by the first and second aperture may be configured as an input for the cooling liquid so that the liquid may flow in the spacing between the inner wall and outer wall towards the second outlet. A circulation system may include a pump that is connected to a heat exchange system so that during circulation heated cooling liquid can release its heat and cooled down so that it can be reused for cooling the lamp.

As will be described hereunder, the shape of the inner aperture may depend on the type of hyperspectral imaging system. For example, in case of a 2D type hyperspectral imaging system, the field of view of the camera will be a square or rectangular shaped area. Hence, in that case, the inner aperture may be square or rectangular shaped. Alternatively, in case of a line-scanner type hyperspectral imaging system, the field of view of the camera will be line shaped so that the inner aperture will be line shaped (as a thin rectangular shaped aperture).

In an embodiment, the illumination source may generate light of a continuous spectrum, in particular a continuous spectrum in the near infrared. Typical, illumination sources that are particularly suited for near infrared hyperspectral imaging include incandescent light sources that are based on a hot filament. Such light sources include halogen light sources. In some applications, a so-called high-intensity discharge (HID) lamp may be used, wherein light is produced by means of an electric arc mechanism in transparent light arc quartz tube that is filled with a noble gas. Such HID lamps include mercury-vapor lamps, metal-halide (MH) lamps, sodium-vapor lamps and xenon lamps.

FIG. 2A-2C depict different cross-sections of a lamp according to an embodiment of the invention. The figures illustrate a lamp 200 comprising a cylindrical (tube-like) illumination source 206, e.g. halogen illumination source, mounted in a housing according to an embodiment of the invention. In particular, FIG. 2A depicts first a cross-sectional view of the lamp in a plane perpendicular to the longitudinal axis of the illumination source. The figure shows a first inner housing 204 that houses the illumination source and a second outer housing 205 which houses the inner housing. The spacing 207 between the inner wall of the inner housing and the outer wall of the outer housing may form a thermal buffer between the illumination source and environment external to the lamp. The figure further illustrates an inner aperture 202 of the inner housing and an outer aperture 203 of the outer housing. The inner and outer housing may include a first outlet 208 and second outlet 210 respectively which may be connected to a cooling system so that heat produced by the illumination source can be transported away out of the lamp.

FIG. 2B shows a cross-sectional view of the lamp in the plane parallel to the longitudinal axis of the lamp. As shown in this figure, the housing extends in the direction of the longitudinal axis of the illumination source. Similarly, the inner and outer aperture may extend parallel to the longitudinal axis of the illumination source, thus forming a line-shaped aperture which allows the lamp to produce a line-shaped illumination area which is suitable for a line-type hyperspectral scanning system.

The first and second outlets that are formed in and connected to the inner and outer housing respectively may be connected to a cooling system, e.g. a venting system, so that one or more air flows can be formed in the lamp as shown in FIG. 2C. This figures shows that a first flow may be formed by gas, such as air, entering the inner housing via the inner aperture 202 which subsequently flows towards the illumination source which is mounted in the curved part of the inner housing. The air heated by the illumination source subsequently exits the inner housing via the first outlet 208. Similarly, a second air flow may be formed by air entering an opening formed between the inner aperture and the outer aperture and subsequently flows via the spacing between the inner wall of the inner housing and the outer wall of the outer housing towards the other end of the lamp where the gas can exit the spacing via the second outlet 210. A detailed view of the opening formed by the inner and outer aperture is shown in the pictures of FIGS. 3A and 3B.

As shown in FIG. 2C, the illumination source 206 may be positioned in the curved part of the inner housing. Further, an opening in the curved part may form the first outlet 208 so that the illumination source effectively is positioned between the inner aperture part 202 and the first outlet 208. This way, if the first outlet is connected to cooling system, heat produced by the illumination source 206 may out of the inner housing based on an airflow in which relatively cool air enters the inner aperture part which is subsequently transported in the inner housing towards the illumination source in the direction of the outlet.

Figure 3A:
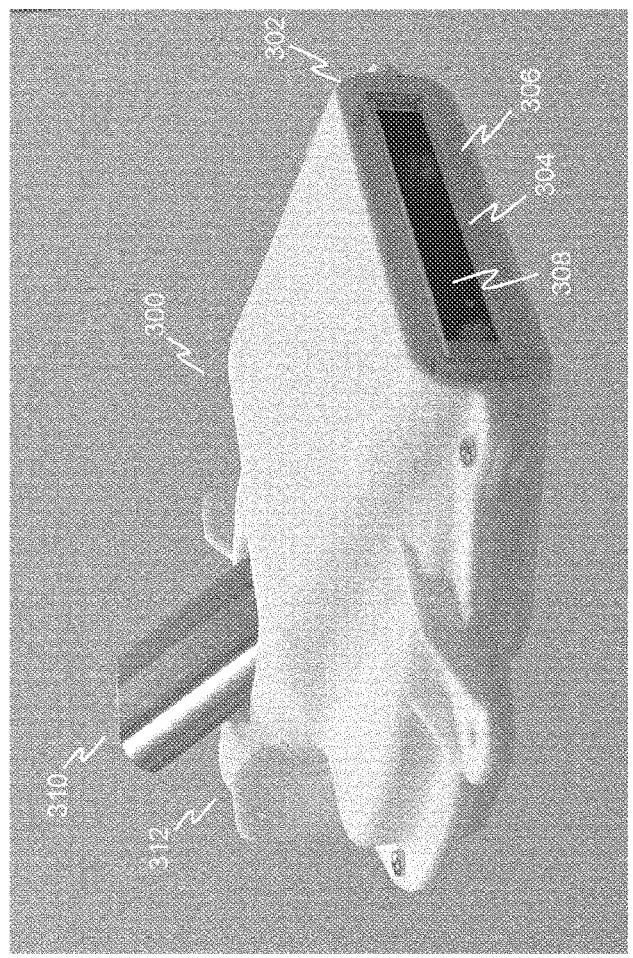
FIG. 3A-3B depict photos of a lamp for hyperspectral imaging according to an embodiment of the invention.
Figure 3B:
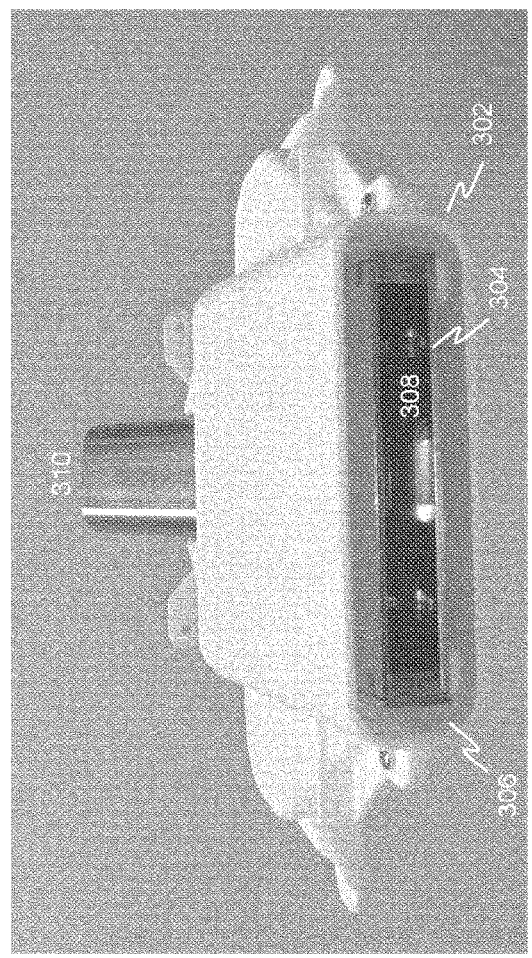

FIGS. 3A and 3B depict photo's of a lamp for a hyperspectral imaging system according to an embodiment. In particular, the figures show a side view and a front view of a lamp 300 for a line-scanning hyperspectral imager as for example described with reference to FIG. 2A-2C. These figures show an outer housing 302 formed around an inner housing 304 wherein the outer housing includes an outer aperture 306 formed around an inner aperture 308. The inner aperture forms an exit for an illumination source (not visible) mounted in the inner housing and an input for a gas, e.g. air, entering the inner housing to form an airflow in the inner housing towards the illumination source, which exits the inner housing via first outlet 310. Similarly, the opening formed between the inner aperture and the outer aperture may form an input for gas, e.g. air, entering the spacing between the inner and outer housing to form a second flow towards the second outlet 312 at the backside of the lamp.

Hence, the figure illustrates an infrared lamp comprising a tube-shaped light source, for example a tube-shaped incandescent light bulb having a longitudinal axis and a radial axis. The inner aperture may be a line-shaped aperture, in this example a substantially rectangular-shaped aperture, wherein the longitudinal axis of the line-shaped aperture may be oriented substantially parallel to the longitudinal axis of the tube-shaped light source. To enhance the nett transport of light towards the aperture, the illumination source may be positioned in a curved part of the housing wherein the walls may comprise a reflective layer, e.g. a metal reflective layer, that is capable to reflect light produced by the illumination source. In an embodiment, the outer housing may be made of a metal, e.g. aluminium or the like. In another embodiment, the outer housing may be made of a material of a low thermal conductivity, e.g. a plastic material.

Figure 4:
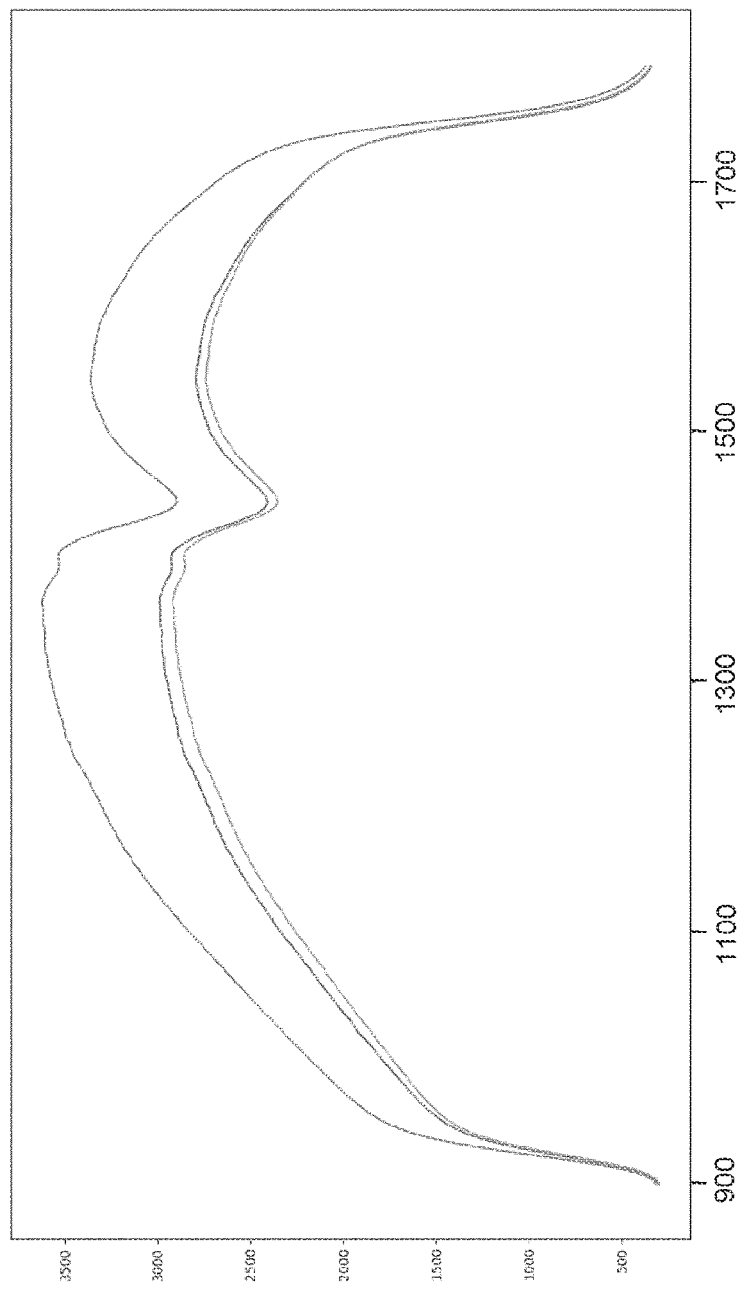
FIG. 4 depicts a continuous near infrared spectrum of a lamp measured by a hyperspectral camera.

FIG. 4 depicts several near infrared spectra of a lamp according to the embodiments in this application. The spectra are captured by a hyperspectral NIR imaging camera. In this case, the lamp comprised a halogen illumination source. The graph depicts a continuous spectrum in the range between 900 and 1700 nm, which is very suitable for near infrared hyperspectral imaging. The suppression at the edges of the spectrum is a consequence of the limitations of the camera.

Figure 5:
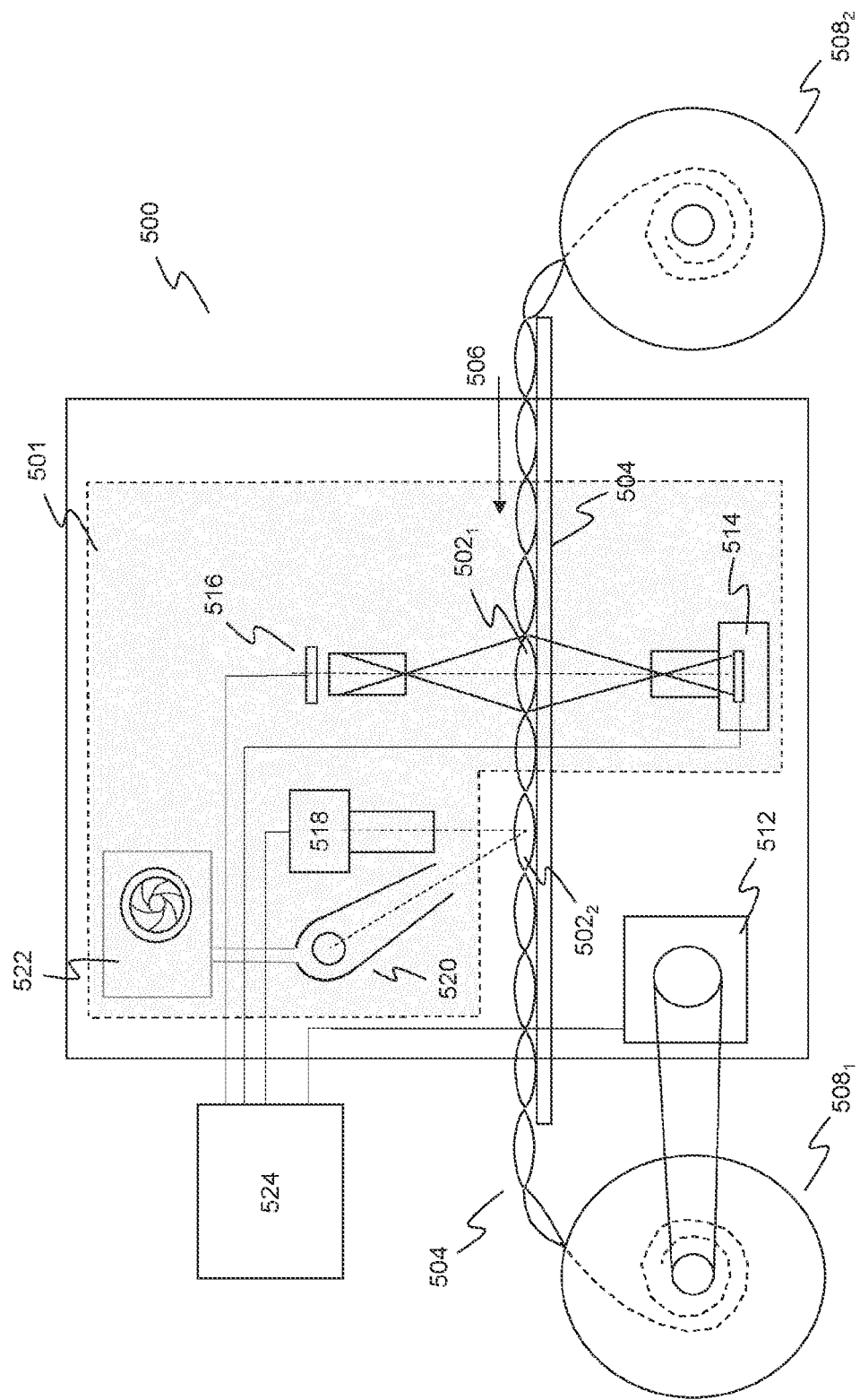
FIG. 5 depicts a medicine inspection apparatus comprising a hyperspectral imaging system according to an embodiment of the invention.

FIG. 5 depicts a medicine inspection apparatus comprising a hyperspectral imaging system according to an embodiment of the invention. In particular, the figure depicts an inspection system 500 comprising an imaging system 501 for imaging one or more medicine objects $502_{1-n}$. The system may further comprise a transport structure 504 comprising a transporting path 506 for guiding one or more medicine objects through an inspection area of the imaging system. The medicine objects may include pills, tablets, capsules, ampules, etc. or a package or pouch comprising such pills, tablets, capsules, ampules, etc., which are inspected based on image data generated by the imaging system. When the inspection system is in use, the medicine objects may be transported over the transport path to the inspection area. In an embodiment, the medicine objects may be configured as a string of packages that can be unwound from a first (upstream) reel $508_2$, guided through the inspection area and rewound around a second (downstream) reel $508_1$. The movement of the reels may be controlled by a motor 512.

Depending on the implementation, the imaging system may comprise one or more camera systems. For example, in an embodiment, the imaging system may comprise a first camera system 514, 516 comprising one or more multispectral image sensors which are configured to capture images of the packets, based on a (limited) number of color channels. For example, an image system may include RGB pixels for capturing an RGB color image or three images for each color channel. Additionally, the image system may include a further color channel, e.g. a color channel in the near infrared (NIR). In another embodiment, the imaging system may comprise a second hyperspectral camera system according to any of the embodiments in this application. The hyperspectral camera system may include a hyperspectral camera 518 and a lamp 520 for illuminating an imaging area of the hyperspectral camera wherein the lamp may be connected to a cooling system 522. The inspection system may be controlled by a controller 524, e.g. a computer, that comprises different modules, e.g. software and/or hardware modules, configured to control the processes that are needed for inspecting the medicine objects.

In an embodiment, the hyperspectral camera may be configured to detect the spectral response of an imaged area in the near infrared (NIR) part of the spectrum. In some embodiments, the hyperspectral camera may also be configured to detect the spectral response of an imaged area in the visible part of the spectrum. In that case, the hyperspectral camera can generate image data both in the visible range and in the NIR range. In certain use cases, if the hyperspectral camera is configured to generate both NIR and visible spectral values for each pixel, a separate multispectral camera, e.g. an RGB or RGB/IR camera is no longer needed. This may be different, if the resolution of the hyperspectral camera is substantially smaller than the multispectral camera. Hence, per camera pixel, a plurality of spectral values, preferably 100 or more spectral values, may be detected in the near infrared band, e.g. between 900 and 1700 nm and/or the visible band. Hence, each spectral value represents a spectral response of an object, e.g. a medicine object, that is imaged by the hyperspectral imaging system.

Pictures generated by the first and second camera system may be processed by an image processing module that is executed by the controller 524. For example, image data of the first camera system, e.g. 2D color pictures such as RGB color pictures, may be analyzed using an image processing algorithm which is configured to localize and recognize medicine objects in the picture based on features such as shape and/or color. Similarly, image data of the second camera system, e.g. a 3D stack of image data comprising spectral information on medicine objects, preferably near infrared spectral information, may be used to determine a fingerprint of a medicine object, which may be compared with reference fingerprints in a database in order to derive information about the composition of the medicine object.

The hyperspectral camera may be implemented in different ways. For example, in an embodiment, the camera may be a 2D imager. In another embodiment, the camera may be implemented as a line scanner. In case of a 2D imager, the camera may comprise a 2D grid of light sensitive pixels configured to generate 2D hyperspectral image data. The 2D hyperspectral image data may include pixels of the imaged area, wherein each pixel is associated with a plurality of spectral response values. In case of a line-scan camera, the camera may comprise a row of light-sensitive pixels, which scans an area at a high line scan frequency to produce 1D hyperspectral image data for each scan. A two-dimensional image of an object can be generated with a line-scan camera if the object moves under the camera at a known speed. In that case, the 1D hyperspectral image data (a line of pixel data, wherein each pixel data includes a plurality of spectral values) that is generated by the line-scanner may be "stitched" together into 2D hyperspectral image data that include pixels of the imaged area, wherein each pixels is associated with a plurality of spectral response values. Thus, the data acquired by the hyperspectral cameras may have the form of a "data cube" having a third dimension representing spectral response at different parts of the spectrum and two other dimensions (in the x and y direction) representing the spatial axis and time, respectively.

In an embodiment, the hyperspectral camera may be configured to generate images in at least the near infrared (NIR) range (wavelengths selected approximately between 900 nm and 1700 nm) of the electromagnetic spectrum. In other embodiments, the hyperspectral camera may be configured to generate images both in the NIR range and in the visible range or only in the visible range. Further, a typical data acquisition of a line-scanner may correspond to a "line" of 600 to 1000 pixels with length approximately between 200 and 300 µm each. The width of the pixel varies according to the field of view of the lens but in our case is approximately between 300 and 600 µm. Every such spatial pixel may comprise more than 200 spectral values spread equidistantly in the 900-1700 nm bandwidth. It is submitted that this figure merely a non-limiting example of a hyperspectral imaging system that may be used in a medicine inspection system according to the various embodiments described in this application.

Figure 6:
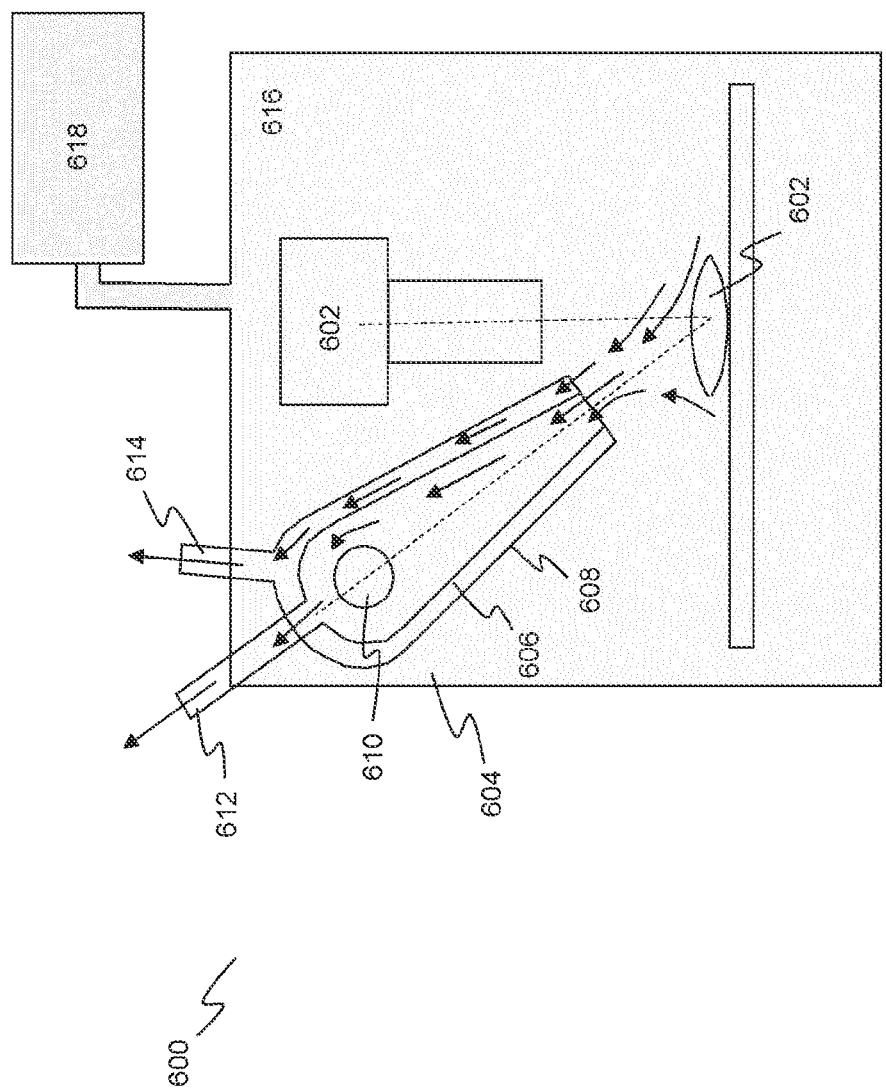
FIG. 6 illustrates a hyperspectral imaging system comprising a lamp according to another embodiment of the invention.

FIG. 6 illustrates a hyperspectral imaging system comprising near infrared lamp according to another embodiment of the invention. In particular, this figure illustrates a hyperspectral imaging system 600 comprising a lamp that is similar to the one described with reference to FIG. 1, including a hyperspectral camera 602 and a lamp 604 for illuminating the imaging area of the hyperspectral camera. The lamp may comprise an inner housing 606 housing an illumination source 610. The inner and outer housing may comprise an inner and outer aperture respectively. Further, the inner and outer housing may comprise a first outlet 612 and second outlet 614 respectively, so that a first flow in the inner housing and a second flow in the spacing between the inner and outer housing can be generated. In this embodiment, the air flow may be generated by locally increasing the air pressure at the aperture part of the lamp. In an embodiment, this may be achieved by enclosing the imaging system in a camera housing 616 wherein the pressure inside camera housing can be controlled by a pressure controller 618.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A lamp for hyperspectral imaging, the lamp comprising:
    an illumination source, the illumination source is a tube-shaped light source;
    an inner housing having a rectangular-shape or line shaped inner aperture, the inner housing containing the illumination source such that light produced by the illumination source can exit the inner housing through an inner aperture;
    an outer housing containing the inner housing, the outer housing including an outer aperture disposed around the inner aperture and a space between the inner housing and the outer housing forming a thermal barrier between the illumination source and an exterior of the lamp; and
    a first outlet, formed in a wall of the inner housing, the first outlet forming a connection between the inner housing and an outside of the lamp, such that a first gas flow entering the inner aperture can move towards the first outlet,
    wherein a longitudinal axis of the rectangular-shaped or line-shaped aperture being oriented substantially parallel to a longitudinal axis of the tube-shaped light source.

2. The lamp according to claim 1, wherein the inner housing comprises a curved part configured to reflect near infrared radiation of the illumination source towards the inner aperture part.

3. The lamp according to claim 1, wherein the first outlet is positioned at a first side of the illumination source and the inner aperture is positioned at a second side of the illumination source.

4. The lamp according to claim 1, wherein the outer housing is a metallic or a plastic housing.

5. The lamp according to claim 1, further comprising a second outlet formed in a wall of the outer housing, the second outlet forming a connection between the space between the inner housing and the outer housing and an outside of the lamp, such that a second gas flow between the inner housing and the outer housing can move towards the second outlet.

6. The lamp according to claim 5, wherein a second gas flow enters an opening formed between the inner aperture and the outer aperture and leaves the second outlet.

7. The lamp according to claim 1, wherein the inner aperture is shaped to form a line-shaped illumination area.

8. The lamp according to claim 7, wherein the illumination source is an incandescent light source, or a high-intensity discharge (HID) light source.

9. A hyperspectral imaging system comprising:
a lamp and a hyperspectral imaging camera, wherein the lamp comprises:
an illumination source;
an inner housing including inner aperture, containing the illumination source such that light produced by the illumination source can exit the inner housing through an inner aperture;
an outer housing containing the inner housing, the outer housing including an outer aperture disposed around the inner aperture and a space between an inner wall and an outer wall forming a thermal barrier between the illumination source and an exterior of the lamp, and a first outlet, formed in a wall of the inner housing; and
a cooling system connected to the first outlet such that a first flow entering the inner aperture is propelled towards the first outlet.

10. The hyperspectral imaging system according to claim 9, further comprising a second outlet formed in the outer wall of the outer housing and connected to the cooling system, the second outlet forming a connection between the space between the inner wall and the outer wall, and an outside of the lamp, such that a second flow is generated in the space between the inner wall and the outer wall and propelled towards the second outlet.

11. The hyperspectral imaging system according to claim 9 wherein the hyperspectral imaging camera has a field of view and wherein the lamp is configured to illuminate one or more medicine objects that are located in the field of view of the hyperspectral imaging camera.

12. The hyperspectral imaging system according to claim 11, wherein the lamp is configured to illuminate at least part of the one or more medicine objects with light of a continuous spectrum.

13. The hyperspectral imaging system according to claim 12, wherein the first flow is a gas entering the inner aperture provides a cooling airflow around the at least part of the one or more medicine objects.

14. A medicine inspection system comprising:
a transport structure comprising a transport path for guiding one or more medicine objects;
a hyperspectral imaging camera having a field of view including at least a portion of the transport path; and
a lamp configured to illuminate the one or more medicine objects that are located in the field of view of the hyperspectral imaging camera, the lamp comprising:
an illumination source;
an inner housing including an inner aperture, containing the illumination source such that light produced by the illumination source can exit the inner housing through an inner aperture;
an outer housing containing the inner housing, the outer housing including an outer aperture disposed around the inner aperture and a space between an inner wall and an outer wall forming a thermal barrier between the illumination source and an exterior of the lamp; and a first outlet, formed in a wall of the inner housing; and
a cooling system connected to the first outlet, such that a first flow entering the inner aperture can move towards the first outlet.

15. The medicine inspection system according to claim 14, wherein the lamp is configured to illuminate at least part of the one or more medicine objects with light of a continuous spectrum.

16. The medicine inspection system according to claim 14, wherein a distance between one or more medicine objects that are illuminated by the lamp and the inner aperture of the lamp is less than 50 mm.

17. The medicine inspection system according to claim 14, wherein
the illumination source is a tube-shaped light source, the inner aperture being a rectangular-shaped or a line-shaped aperture, a longitudinal axis of the rectangular-shaped or line-shaped aperture being oriented substantially parallel to a longitudinal axis of the tube-shaped light source.

* * * * *